United States Patent
Digernes et al.

(10) Patent No.: US 8,337,125 B2
(45) Date of Patent: Dec. 25, 2012

(54) CONTAINER ADAPTED TO BE INSERTED IN A TOOL HOLDER, A TOOL HOLDER AND A SYSTEM

(75) Inventors: Anders Digernes, Trondheim (NO); Audun Skjellnes, Trondheim (NO); Olav Risstad, Spongdal (NO); Thomas Jensen, Trondheim (NO); Einar Sundseth, Heimdal (NO); Knut S. Stokland, Heimdal (NO)

(73) Assignee: Teeness ASA, Trondheim (NO)

( * ) Notice: Subject to any disclaimer, the term of this patent is extended or adjusted under 35 U.S.C. 154(b) by 926 days.

(21) Appl. No.: 12/308,387

(22) PCT Filed: Nov. 1, 2006

(86) PCT No.: PCT/NO2006/000394
§ 371 (c)(1),
(2), (4) Date: Mar. 9, 2009

(87) PCT Pub. No.: WO2008/002145
PCT Pub. Date: Jan. 3, 2008

(65) Prior Publication Data
US 2010/0242696 A1 Sep. 30, 2010

(30) Foreign Application Priority Data
Jun. 28, 2006 (NO) .................................. 2006 2999

(51) Int. Cl.
*B23B 51/06* (2006.01)
(52) U.S. Cl. .............................. 408/143; 408/56; 279/20
(58) Field of Classification Search .................. 408/143, 408/56, 57, 59; 279/20
See application file for complete search history.

(56) References Cited

U.S. PATENT DOCUMENTS
3,642,378 A 2/1972 Hahn et al.
(Continued)

FOREIGN PATENT DOCUMENTS
DE 2 302 732 7/1973
(Continued)

OTHER PUBLICATIONS

Japanese Office Action issued Nov. 2, 2011 (in English language) in corresponding Japanese Patent Application No. 2009-518022.

(Continued)

*Primary Examiner* — David Bryant
*Assistant Examiner* — Michael Vitale
(74) *Attorney, Agent, or Firm* — Wenderoth, Lind & Ponack, LLP

(57) ABSTRACT

A system with a container (1) and a tool holder (20) having two ends (21, 22). One of the ends of the tool holder is adapted to be secured to a machine tool and the other end is adapted for attaching a cutting edge or a cutting edge carrying unit. The tool holder includes an internal cavity (23) surrounded by a cavity wall. The cavity accommodates the container. One end of the cavity is adapted for connection to a supply for a cooling medium and the other end is connected to an outlet for cooling medium. The cavity furthermore includes an opening (25) for installation of the container. At least one gap for leading the cooling medium is formed between the container and the cavity wall. The container can be installed in a machine tool, and the container can be used to accommodate one or several sensors for measuring parameters or for receiving a damping system.

21 Claims, 3 Drawing Sheets

U.S. PATENT DOCUMENTS

| | | | |
|---|---|---|---|
| 3,838,936 A | 10/1974 | Andreassen et al. | |
| 4,061,438 A | 12/1977 | New | |
| 4,543,019 A * | 9/1985 | Shikata | 408/57 |
| 4,553,884 A | 11/1985 | Fitzgerald et al. | |
| 5,066,173 A | 11/1991 | Gaffan et al. | |
| 5,413,318 A * | 5/1995 | Andreassen | 267/140 |
| 6,030,155 A | 2/2000 | Scheer et al. | |

FOREIGN PATENT DOCUMENTS

| | | |
|---|---|---|
| DE | 197 07 549 | 9/1997 |
| EP | 0 094 557 | 11/1983 |
| JP | 1-125103 | 8/1989 |
| JP | 5-53811 | 7/1993 |
| JP | 6-505322 | 6/1994 |
| JP | 7-27703 | 5/1995 |
| JP | 8-47802 | 2/1996 |
| JP | 9-174303 | 7/1997 |
| JP | 2002-113603 | 4/2002 |
| JP | 2002-168319 | 6/2002 |
| JP | 2006-502012 | 1/2006 |
| SU | 1196153 | 12/1985 |
| SU | 1196153 A * | 12/1985 |

OTHER PUBLICATIONS

International Search Report issued Mar. 30, 2007 in the International (PCT) Application of which the present application is the U.S. National Stage.

* cited by examiner

CONTAINER ADAPTED TO BE INSERTED IN A TOOL HOLDER, A TOOL HOLDER AND A SYSTEM

BACKGROUND OF THE INVENTION

1. Technical Field

The present invention concerns a container/cartridge particularly adapted to be built into machine tools and tool holders. The container provides a stable and strong attachment to the tool and at the same time provides channels for conveying cooling medium, typically a cutting liquid. The invention also concerns a tool holder adapted for installation of the above mentioned container, and a use of a container for accommodating sensors or damper systems.

2. Description of the Related Art

During machining, a requirement or need to build various elements into the tool/tool holder can arise. The elements may include sensors for monitoring for instance temperature, vibrations, forces or similar properties, or elements that imposes particular properties on the tool. Damping of vibrations is typically such a property. Such vibrations emerge when the natural frequency of the tool is in the same frequency area as the force variations in the machining. The vibrations can also arise when the machining parameters are unfavorable and is particularly common when it is discontinuous cutting (typically milling).

During damping of vibrations a damping system is frequently mounted internally in the tool. There are several patents that show such damping systems. Common for most of these is that they are installed directly in a cavity in the tool. The result is that the cooling medium cannot be brought forward, or that it has to be lead through the damping system with dedicated tubes or other particularly designed means.

Tool holders are normally manufactured of a solid material, with outer geometries to hold cutting edges and for being fixed to a machine or clamping units. Frequently the tool has internal ducting for bringing a cooling medium forward. The cooling medium (cutting liquids) is often necessary to perform the machining.

An example of a tool holder with a damping apparatus installed is shown in U.S. Pat. No. 4,061,438. The tool holder includes a damping element placed in a capsule at the forward end of the tool holder. However, attachment of the capsule is complicated and the cooling medium cannot be brought past the tool holder.

SUMMARY OF THE INVENTION

The present invention concerns a system with a container and a tool holder. The system is designed for use in connection with chip cutting machining and eases attachment, placement and connection of vibration damping devices and the localization of sensors, at the same time as a cooling medium is brought forward. The tool holder has two ends. A first end of the tool holder is adapted for being fixed to a machine tool and a second end of the tool holder is adapted for attachment of a cutting edge. The tool holder includes an internal cavity surrounded by a cavity wall. The cavity contains the container. One end of the cavity is adapted for being connected to a supply for a cooling medium and the other end is connected to an outlet for cooling medium. The outlet is typically connected with a nozzle for leading the cooling medium towards a cutting edge, and the inlet is typically connected with a source for cooling medium and a pump. The cavity includes an opening for installing the container. At least one recess for leading the cooling medium is formed between the container and the cavity wall.

The recess can be made as at least one cut out in the container.

The recess can be made as at least one cut out in the cavity wall.

The recess can be made in the cavity wall and in the container. Furthermore, it is described a container, a cartridge or sleeve to be inserted in a cavity with a cavity wall in a tool holder. The container includes at least one central part and end parts. At least one of the end parts is releasably connected to the central part. The central part includes an outer surface with at least one area adapted to be in contact with the cavity wall in the tool holder and at least one area adapted for contact with a cooling fluid when the tool holder with the container is in use. The area adapted for contact with the cooling medium is adapted to abut one clearance between the outer surface of the central part and the cavity in the machine tool. The purpose of the clearance or clearances is to bring forward a cooling medium, for instance a gas or typically a cutting liquid. The size of the clearance will typically be affected by the amount of cooling medium that has to pass the container.

The container may include a smooth surface and can be adapted for being inserted in a cavity with recesses, in the cavity wall.

The at least one area of the container that is adapted to be in contact with a cooling fluid, can be adapted to provide one clearance between the outer surface of the central part and the cavity wall in the tool holder.

The central part may include an external cylindrical part with a number of ridges placed along the cylindrical part, as these ridges provide areas for contact with the cavity of the tool holder and where the areas between the ridges are adapted to create the clearances for bringing forward the cooling medium between the container and the tool holder.

The cylindrical part does not necessarily have to extend along the entire length of the container. The essential feature is that the container maintains a stable localization in the cavity at the same time as fluid can pass the container.

The container will typically be cylindrical with recesses milled into the cylinder, but other shapes may well be used. For instance, the container may be shaped as a rectangular or square bar, have an oval cross section etc. If for instance the container is oval and the cavity is cylindrical, both contact faces and recesses will be provided. The same can be said about a square container in a cylindrical cavity.

The at least one area for contact with the cavity in the machine tool can form contact points placed in a circular configuration to be adapted for contact with a cylindrically shaped cavity in the machine tool. The contact points may not need to extend along the entire length of the container, but can be formed by discontinuous elevations of any shape on the outside of the container. The end parts or the lid can also form the contact points towards the cavity wall and may include recesses for bringing forward the cooling medium.

The central part may include one or several cylindrical parts with a central axis and the elevations can be made as ridges that extend parallel to this central axis. The elevations can be arc shaped, straight, curved or include any other suitable shape.

The central part may include one or several cylindrical portions with a central axis, and the elevations can be shaped as ridges that extend in a spiral or helix around the central axis.

The central part may include one substantially cylindrical cavity, and one of the end parts may be integrated in the central part.

The central part may include a substantially cylindrical cavity, and both of the end parts may be releasably connected to the central part.

That or the releasably connected end parts can be adapted with a press fit to the central part, such that installation of the end part in the central part will lead to an expansion of the central part. Alternatively, other designs can be used for installation, for instance threads, screws, bayonet joints etc.

One of the ends of the container may include a recessed section for contact with the cavity of the machine tool.

Furthermore, the invention concerns a tool holder with two ends, where one of the ends is adapted for being secured in a machine tool and the other end is adapted for being secured to at least one cutting edge. The cutting edge or edges do not need to be secured directly to the holder, but can be secured in a further part or a cutting edge holding unit that holds the edge or edges. The holder may include an internal cavity with a cavity wall. The cavity is adapted to take up a container as described above in that one of the ends of the cavity is connected to a supply for cooling medium and the other end is connected to an outlet for cooling medium. The cavity includes an opening for installation of the container.

The largest dimension of the container, the releasable end part of the container and the internal cavity of the tool holder, can be mutually adapted such that the container is pressed fixedly towards the cavity wall in the internal cavity of the tool holder when the releasable end part of the container is pressed in place in the central part of the container.

The cavity wall may include recesses for leading cooling fluid instead of, or in addition to recesses or cut outs in the container.

The internal cavity of the tool holder can be chamfered, for mutual interfitting contact with a chamfered section of the container.

Furthermore, the invention concerns a tool holder with two ends and an internal cavity, where one end is adapted for being fixed to a machine tool and the other end is adapted for fixing a cutting edge. The cavity is adapted to accommodate a container as described above, in that one end of the cavity is connected to a supply for a cooling medium, and the other end is connected to an outlet for cooling medium. The cavity includes an opening for installation of the container.

The opening for installation of the container can be directed towards the machine tool.

The opening for installation of the container can alternatively be directed towards the at least one cutting edge or towards the end where an element is situated for fixing one or several cutting edges.

The cavity may include at least one cylindrical portion for contact with the at least one area of the container for contact with the cavity wall.

The largest dimension of the container, the releasable end part of the container and the internal cavity of the tool holder can be mutually interfittingly adapted such that the container is pressed towards the cavity wall and is thereby fixed in the internal cavity of the tool holder when the releasable end part of the container is pressed into the central part of the container.

The internal cavity of the tool holder can be chamfered for mutual interfitting contact with the chamfered section of the container.

The invention also concerns use of a container as described above for containing one or several sensors for measuring parameters in connection with the machine tool and/or for accommodating a damping system.

According to the present invention the cutting fluid can be brought forward on the outside of the container. Thereby it is not necessary to provide a tube through the damping system. The damping system can be isolated inside the cartridge sleeve. The cutting liquid or air that is lead past the cartridge on the outside contributes to the cooling of the cartridge and its content. The function of the damping system is therefore less affected by the heat that is supplied by the cutting process, compared to similar damping systems where the cutting liquid cannot be lead on the outside of the damping system.

With a container according to the invention in combination with a tool holder according to the invention, a very simple installation of the tool can also be achieved. Few parts are required, and the use of adhesives, sealing compounds etc. can be avoided. Furthermore, the cooling medium can be brought forward effectively. The container is given a cooling effect, the container is fixed well in the tool holder, and the content of the container is given good protection. The clearance areas or the recesses of the container can be cylindrical external recesses. Furthermore, the recesses may be spiral shaped. The container may also have loose lids at both ends, and the length of the container, the diameters and the remaining geometry can be adapted to the required needs. Furthermore, the end face geometry can be adapted to the cavity. If needed, the elements of the container can communicate with the surroundings through ordinary sender/receiver technology, transceiver technology, data can be logged to an integrated memory unit of the container that can be read at frequent intervals, data can be directly transferred by slip rings on the tool holder etc.

DETAILED DESCRIPTION OF THE INVENTION

Figure 1:
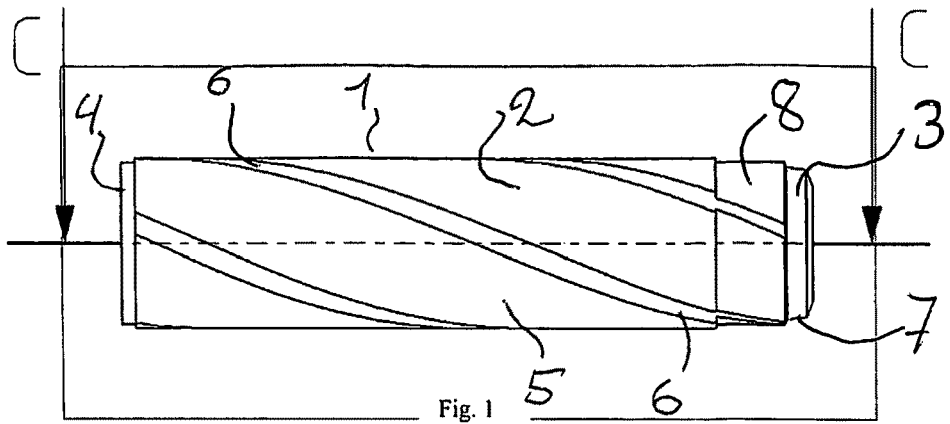
FIG. 1 shows a side elevation of a container according to one embodiment of the invention.

A detailed description of embodiments of the invention with reference to the drawing figures follows.

FIG. 1 shows a container 1 with a central part 2, an integrated end part 3 and a releasable end part or lid 4. As can be seen in FIG. 1, the container includes contact areas 5 for contact with a cavity in a machine tool, and clearance areas 6 creating a clearance in the cavity of the machine tool. The clearances 6 are shown as recesses in the container 1, and these include a helical, spiral or screw configuration. These clearances are adapted for leading a cooling medium, for instance cutting liquid or air. A spiral or helical configuration can be preferable to increase the length of the channels or clearances 6, such that the time the cooling medium resides around the container is increased.

The end part 3 that is integrated in the central part is shown with recesses 7 for contact with adapted recesses in the cavity where the container 1 is to be placed.

One of the recesses 7 is shown as a conical recess to ensure that the container 1 is centered and is given a fixed position without the container 1 being movable in relation to the cavity where it is to be placed.

Figure 2:
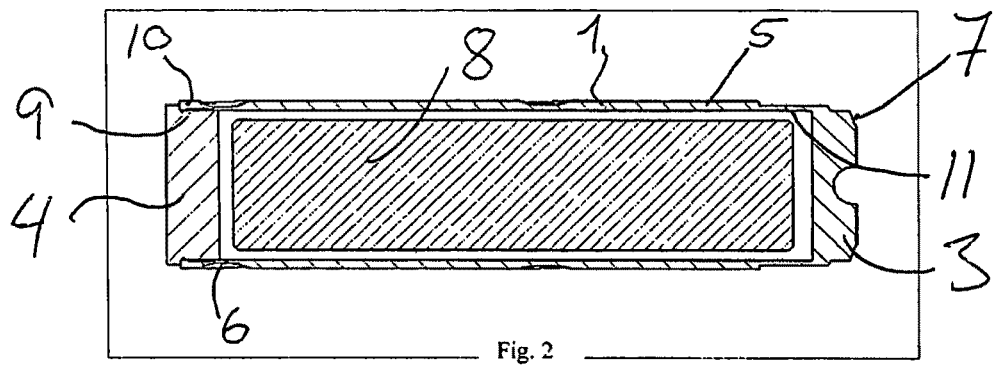
FIG. 2 shows a cross section of the container shown in FIG. 1.

FIG. 2 shows the container shown in FIG. 1 in cross section. The container of FIG. 2 includes a damping system 8 or a damping body. FIG. 2 also shows the cross section of the lid 4 or the end part and how this is adapted to the central part 2. The lid 4 and the geometry 10 at the end of the central part 2 is such that the lid 4 has been given a diameter 9 that is adapted to the inner diameter 10 of the central part 2, such that it in one operation is possible to secure the lid 4 to the main part or central part 2 and at the same time clamp the walls of the central part 2 and thereby the entire container 1, to an inner wall of the cavity where the container 1 is to be placed. This design provides the container with a given rigid clamping force towards the cavity where the container 1 is to be placed, both in a radial direction and an axial direction. The other end part 3 of the main part or central part 2 has been given a geometric shape 7 or recess that opposes the clamping force and includes at the same time channels for leading the cooling medium forward. Furthermore, a gradual reduction or chamfering 11 can be adapted to the inner geometry of the cavity, and/or can contribute to improved flow conditions around the end or can improve the elasticity of the container at the end to accommodate tolerances between the container 1 and the end part of the cavity where this is chamfered to abut the container.

FIG. 2 shows the lid 4, and how the outer geometry 9 of the lid is adapted to the inner geometry 10 of the central part 2. A damping system 8 is schematically shown in FIG. 2. The contact areas 5 and the clearances areas 6, channels, or recesses are clearly shown in FIG. 2.

When assembling the container 1 into the cavity of the tool, the lid 4 is first placed in the central part 2, but is not pressed entirely into its final position. The container 1 is thereafter installed in the cavity of the machine tool and is placed such that the end part 3 with the geometry 7 abuts the end wall of the cavity. The lid 4 is thereafter pressed to its final position with a suitable tool. This provides an elastic deformation between the lid 4 and central part 2 that again provides a clamping force towards the cavity.

Figure 3:
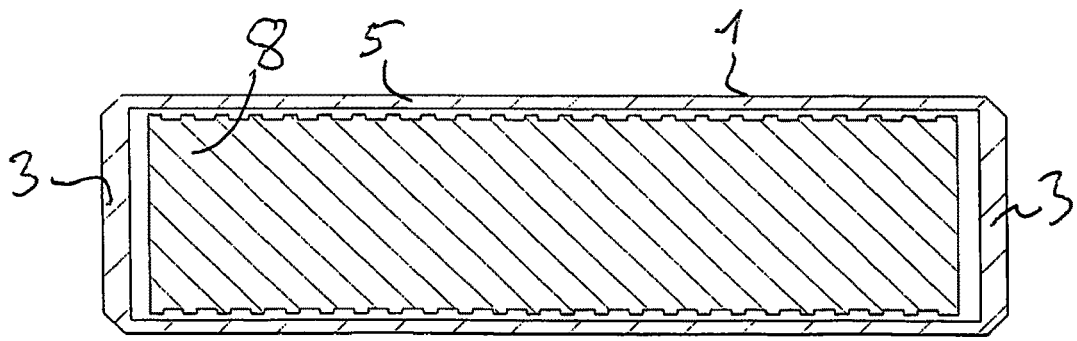
FIG. 3 shows a cross section of a container according to a further embodiment of the invention.

FIG. 3 shows an alternative embodiment of a container including two integrated end parts 3 and the damping system 8 includes a damping body adapted to be placed in a damping fluid. The damping body is shown with transversal rifles to increase the influence the damping fluid has on the damping body.

Figure 4:
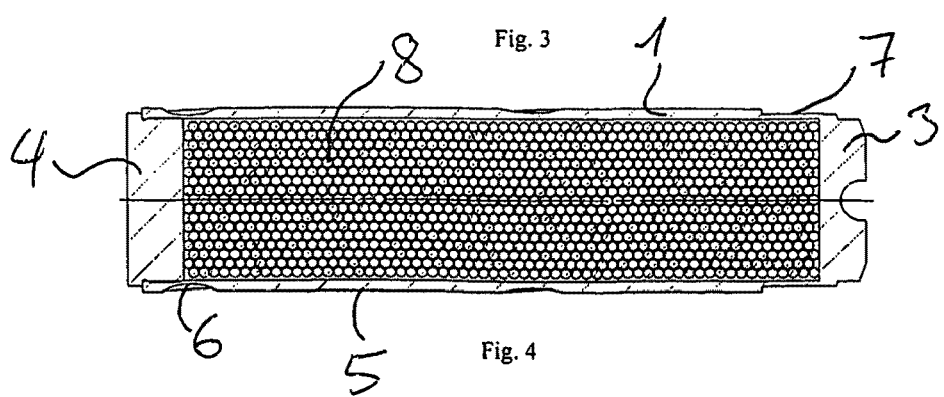
FIG. 4 shows a cross section of a container according to a further embodiment of the invention.

FIG. 4 shows an alternative embodiment of a container 1 having an integrated end part 43, a releasable lid and a damping system 8 with particles adapted to be placed in a damping fluid. The end part 3 that is integrated in the central part is shown with chamfering geometry 7 for contact with adapted chamfering in the cavity where the container 1 is to be placed. FIG. 4 also shows the contact areas 5 for contact with a cavity in the machine tool, and the clearance areas 6 that create a clearance in the cavity in the machine tool.

Figure 5:
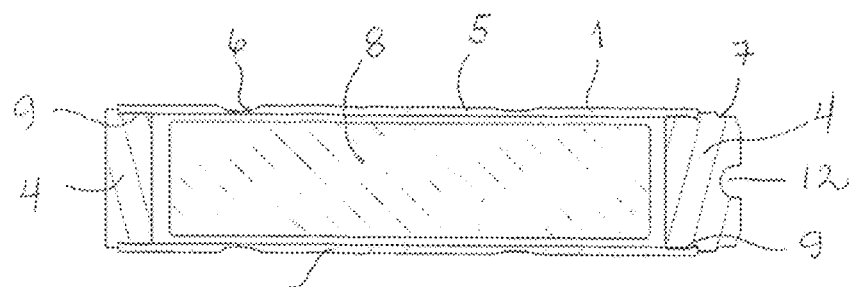
FIG. 5 shows a cross section of a container according to a further embodiment of the invention.

FIG. 5 shows an alternative embodiment of a container having two releasable end pieces 4 and a damping system 8 including a damping body. In this embodiment, one of the end pieces is shown with a chamfering geometry 7, channel 12 for the cooling media and a profile 9 adapted to the central part 2.

Figure 6:
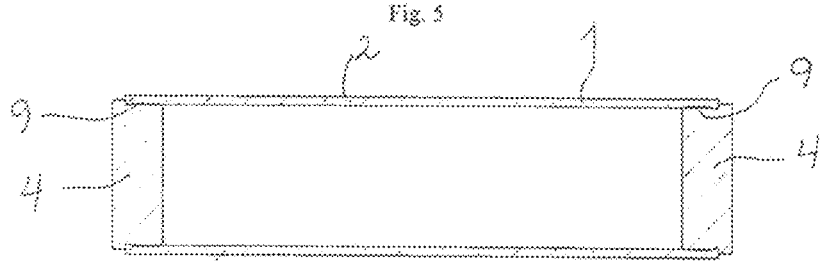
FIG. 6 shows a cross section of a container according to a further embodiment of the invention.

FIG. 6 shows an alternative embodiment of a container provided with two releasable end pieces/lids 4, and an empty cavity for installation of, for instance, different measuring equipment and sensors etc.

Figure 7:
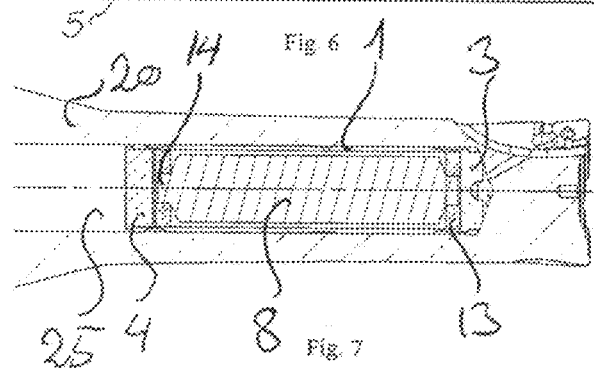
FIG. 7 shows a cross section of a container according to a further embodiment of the invention.

FIG. 7 shows an alternative embodiment of a container 1 placed in a cavity 23 in a tool holder 20, where the container 1 has a releasable end piece 4 and an integrated end piece 3. A damping system 8 including a damping body is shown secured to two elastic bodies 13 placed inside the container 1. The damping body is shown with two pins 14 that go into the elastic bodies 13. Alternatively, the damping body could have had plane ends secured with adhesive bonding or in another way secured to the end pieces/lids 3, 4 of the container 1, such that the forces are being imposed on the elastic elements 13 as shear forces on the elastic elements 13 instead of in compression as shown in the figure.

The damping system 8 shown in FIG. 2 can be an ordinary damping system, and there are several patents that show such damping systems. Common for all of these is that they are assembled directly into a cavity of the tool.

The damping system 8 may include a free damping body in a damping fluid, damping masses suspended in spring systems, damping masses suspended in elastomer materials etc. The damping system may also include active damping systems that are adjusted according to a predetermined frequency area (bandwidth) for the damping etc.

Figure 8:
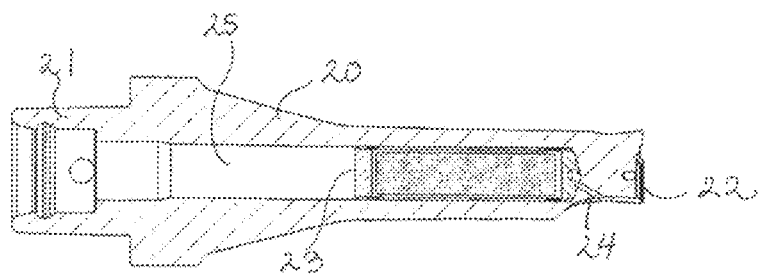
FIG. 8 shows a cross section of the tool holder according to the invention.

FIG. 8 shows an example of a tool holder 20 according to the invention. The tool holder 20 include two ends 21, 22 where one of the ends 21 is adapted to be secured to a machine tool and the other end 22 is adapted to be secured to a cutting edge. Beyond this, the tool holder 20 includes any outer geometry, common for tool holders. The tool holders include channels 24 for leading a cooling fluid to the cutting edge. A cavity 23 for accommodating a container 1 according to the invention is clearly shown. The cavity is adapted for containing the container 1 in an opening 25 also forms a channel for supply of a cooling medium. The diameter of the opening 25 is adapted to the outer diameter of the container 1 as previously described. Furthermore, a second end is connected to an outlet from the channel 24 for a cooling medium. In the embodiment shown in FIG. 8, the opening 25 is shown as a boring for installation of the container 1, directed towards the machine tool. However, the opening 25 may just as well be directed towards the end 22 for securing the cutting edge.

Figure 9:
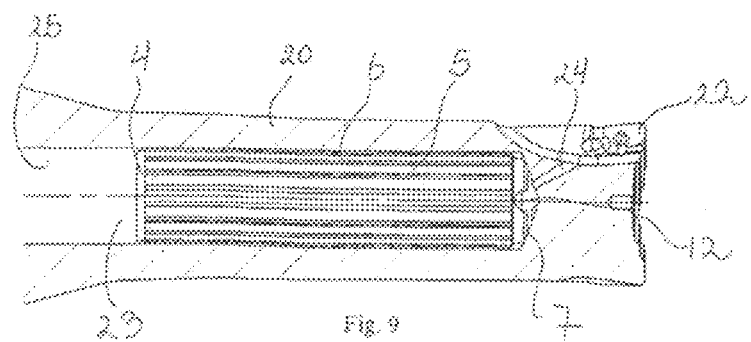
FIG. 9 shows in detail a part of the cross section shown in FIG. 8.

FIG. 9 shows a detail of FIG. 8, where the lid 4 of the container 1 is clearly shown, and where a damping system 8 is shown placed in the container 1. The areas with clearance between the container 1 and tool holder 20, defined as 6, are also clearly shown. Similarly, the contact areas 5 between the container 1 and the cavity in the tool holder 20 are shown in the figure.

FIG. 9 also shows how the end part 3 of the container 1 includes a geometry 7 that is adapted to the geometry of the cavity 23 in the tool holder 20. A channel 12 is shaped as a cut out in the end part 3 contributes to leading cooling fluid from the clearance area 6 and to the outlet of channel 24 for the cooling fluid.

Figure 10:
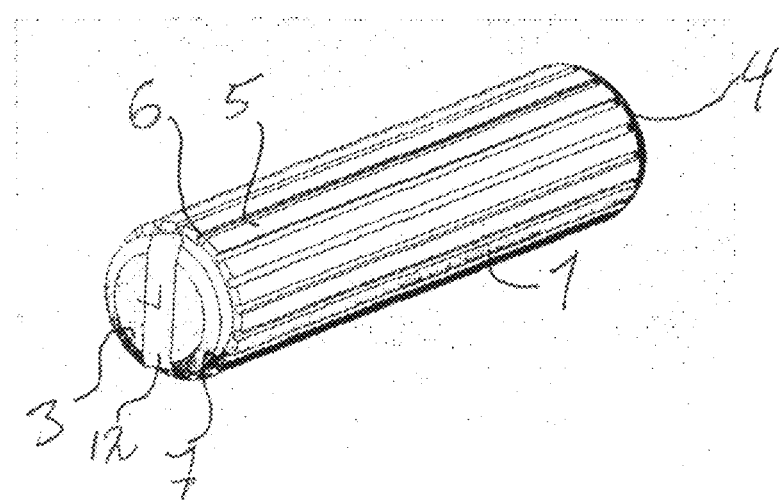
FIG. 10 is a perspective view of an embodiment of the invention.
Figure 11:
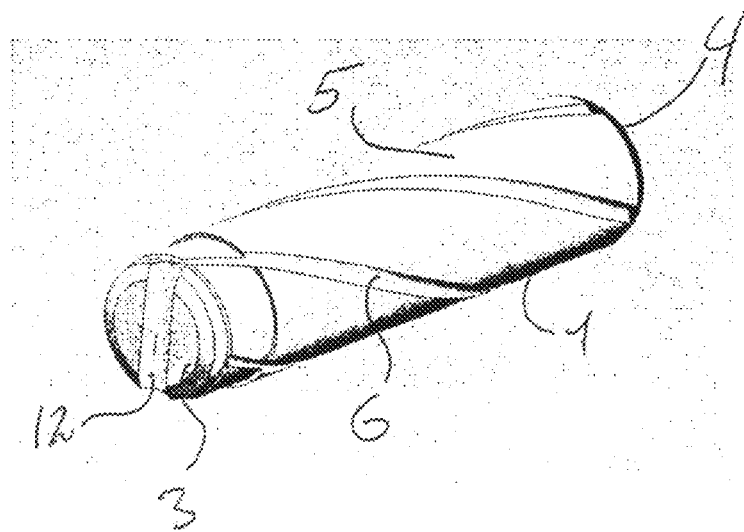
FIG. 11 is a perspective view of the invention as shown in FIGS. 1 and 2.

In FIGS. 10 and 11, recesses are shown and the recesses form the clearance areas 6 and the contact areas 5 for contact with the cavity. As shown in FIG. 10, the recesses are parallel to the central axis of the container 1. The contact areas 5 and clearance areas 6 formed as recesses are clearly shown.

Furthermore, the releasable end lid 4, the geometric shape 7 at the end of the container 1 and a further channel 12 formed as an end recess is shown.

FIG. 11 is perspective view of the container 1 as shown in FIG. 1 and FIG. 2. The container 1 is shown with a central part 2 having a contact area 5 for contact with the inner cavity of a machine tool, and a clearance area 6 that forms a clearance with the container 1 and the cavity of the tool holder. FIG. 11 shows recesses that are shaped as spirals around the central axis of the container.

Figure 12:
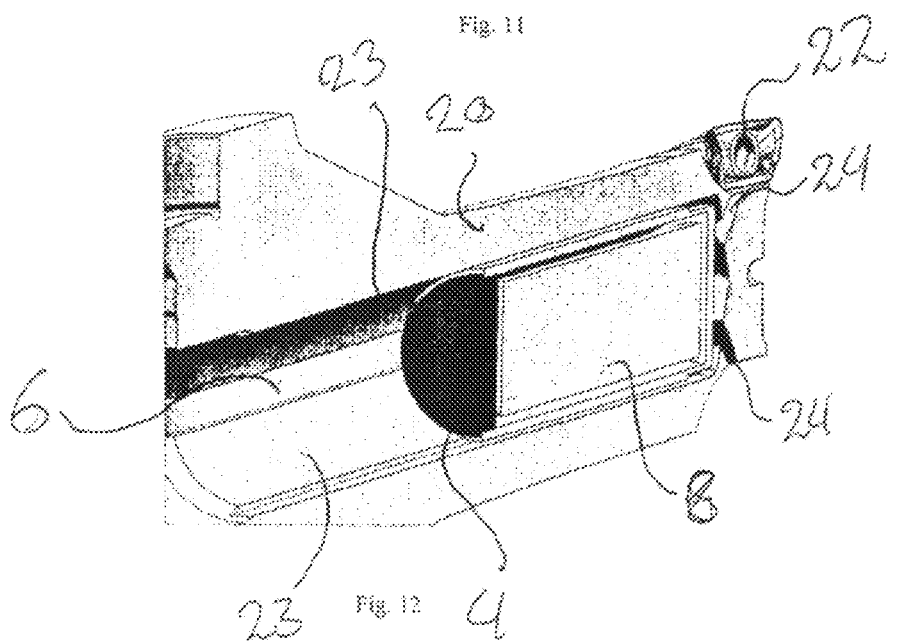
FIG. 12 is a cut through perspective drawing of still a further embodiment of the invention.

FIG. 12 shows a system with a container and a tool holder 20 where the cavity 23 of the tool holder is shown with clearance areas 6 formed as recesses for leading forward the cooling medium and where the container has a smooth outer surface. Furthermore; the container has a damping system 8 with a damping body, a lid 4, channels 24 for bring forward the cooling medium to the cutting edge and an end 22 for securing a cutting edge.

The invention claimed is:

1. A system for building various elements into a tool holder, the system comprising a container and a tool holder for machine tools having a first end and a second end, the first end of the tool holder being adapted to be fixed to a machine tool and the second end being adapted for attachment of a cutting element,
    wherein the tool holder includes an internal cavity defined by a cavity wall,
    wherein the container is provided in the cavity,
    wherein one end of the cavity is adapted for connection to a supply of a cooling medium and the other end of the cavity is connected to an outlet for the cooling medium,
    wherein the cavity includes an opening for installation of the container, and at least one gap for leading the cooling medium is formed between the container and the cavity wall, and
    wherein the container is in a fixed position without being movable in relation to the cavity.

2. A system according to claim 1, wherein the gap is formed by at least one recess in the container.

3. The system according to claim 1, wherein the gap is formed by at least one recess in the cavity wall.

4. The system according to claim 1, wherein the gap is formed in the cavity wall and in the container.

5. A container for building various elements into a tool holder, and for installation in a cavity with a cavity wall in a tool holder, wherein the container includes at least a central part and end parts, wherein the end parts are connected to the central part, and
    wherein the central part includes an external surface with at least one contact area adapted for contact with the cavity wall in the tool holder and at least one clearance area adapted for contact with a cooling fluid.

6. The container according to claim 5, wherein the central part includes a smooth surface and is adapted to be installed in the cavity, and wherein the cavity includes recesses in the cavity wall.

7. The container according to claim 5, wherein the at least one area adapted to be in contact with a cooling fluid is adapted to form a clearance between an outer surface of the central part and the cavity wall in the tool holder.

8. The container according to claim 7, wherein the central part includes an external substantially cylindrical portion with a number of elevations placed along the cylindrical portion, wherein the elevations form areas for contact with the cavity wall in the tool holder and the areas between the elevations are adapted to form clearance for bringing forward the cooling medium between the container and the tool holder.

9. The container according to claim 8, wherein the substantially cylindrical portion defines a central axis, and the elevations are formed as ridges extending parallel to the central axis.

10. The container according to claim 8, wherein the substantially cylindrical portion defines a central axis, and the elevations are formed as ridges that extend in a spiral or helix around the central axis.

11. The container according to claim 5, wherein the central part includes a substantially cylindrical cavity, and one of the end parts is integrated in the central part and the other end part is releasably connected to the central part.

12. The container according to claim 5, wherein the central part includes a substantially cylindrical cavity, and both of the end parts are releasably connected to the central part.

13. The container according to claim 11, wherein the end part is press fit to the central part, wherein the end part is releasable connected end part, such that installation of the end part in the central part leads to an expansion of the central part.

14. The container according to claim 5, wherein at least one of the end parts of the container includes a chamfered section for contact with the cavity wall in the tool holder.

15. A tool holder into which a container can be installed for building various elements into the tool holder, the container including at least a central part and end parts, wherein the end parts are connected to the central part, wherein the central part includes an external surface with at least one contact area adapted for contact with a cavity wall in the tool holder and at least one clearance area adapted for leading a cooling fluid between the external surface and the cavity wall,
    the tool holder having a first end, a second end, and an internal cavity defined by the cavity wall,
    wherein the first end of the tool holder is adapted for being fixed to a machine tool and the second end is adapted for attachment of a cutting edge or cutting element carrying unit, and
    wherein the internal cavity is adapted to receive the container so that one end of the internal cavity is connected to a supply for a cooling medium and the other end is connected to an outlet for the cooling medium, and the cavity includes an opening for installation of the container.

16. The tool according to claim 15, wherein the opening for installation of the container is located in the first end.

17. The tool holder according to claim 15, wherein the opening for installation of the container is formed in one of the first and second ends of the tool holder.

18. The tool holder according to claim 15, wherein the cavity wall includes at least one cylindrical portion for contacting the at least one area of the container.

19. The tool holder according to claim 15, within the largest dimension of the container, the releasable end part of the container and the internal cavity of the tool holder are mutually adapted such that the container is pressed to a fixed position towards the cavity wall in the internal cavity of the tool holder when the releasable end part of the container is pressed in place in the central part of the container.

20. The tool holder according to claim 15, wherein the cavity wall includes recesses for leading a cooling fluid.

21. The tool holder according to claim 15, wherein the internal cavity of the tool holder is chamfered, for mutual inter fitting contact with a chamfered section of the container.

* * * * *